United States Patent [19]
Rodrigues

[11] Patent Number: 5,020,464
[45] Date of Patent: Jun. 4, 1991

[54] BRAILING SYSTEM FOR COMMERCIAL FISHING BOATS

[76] Inventor: Augusto R. Rodrigues, 5061 Camino Playa Portofino, San Diego, Calif. 92124

[21] Appl. No.: 516,531
[22] Filed: Apr. 30, 1990
[51] Int. Cl.⁵ .............................................. A01K 79/00
[52] U.S. Cl. ........................................ 114/255; 43/6.5; 43/8; 43/11
[58] Field of Search ...................... 114/255; 43/4.5, 8, 43/6.5, 7, 10, 11, 14, 100, 101, 102, 103, 104, 105

[56] References Cited

U.S. PATENT DOCUMENTS

| 827,076 | 7/1906 | Bolitho | 43/8 |
| 1,786,342 | 12/1930 | Greene | 43/8 |
| 3,113,394 | 12/1963 | Puretic | 43/8 |
| 3,638,345 | 2/1972 | Whaley | 43/8 |
| 4,125,955 | 11/1978 | Puretic | 43/8 |
| 4,449,315 | 5/1984 | Puretic | 43/8 |
| 4,894,943 | 1/1990 | Allen et al. | 43/8 |

FOREIGN PATENT DOCUMENTS 676346  11/1964  Italy .......................................... 43/8

Primary Examiner—Sherman D. Basinger
Assistant Examiner—Stephen P. Avila
Attorney, Agent, or Firm—Charles C. Logan, II

[57] ABSTRACT

A brailing system for commercial fishing boats that speeds the process of taking the fish from the pursing net that has been gathered next to the ship and transferring the fish into the storage chambers of the ship. Novel structure for reciprocally, pivotally and rotatably supporting the rear end of the brailing pole reduces the number of men required to dip the brailing pole into the pursing net.

8 Claims, 4 Drawing Sheets

BRAILING SYSTEM FOR COMMERCIAL FISHING BOATS

BACKGROUND OF THE INVENTION

The invention relates to fishing boats and more specifically to commercial fishermen that use a pursing net that is gathered next to the ship at which time the fish captured within the pursing net are scooped out therefrom and deposited in the storage chambers of the ship.

In the past, it has been common to use a brailing pole for scooping the fish out of the pursing net. Three or four crew members are usually on a skiff floating adjacent the pursing net and it is their job to push the front end of the brailing pole with the brailing net mounted thereon down under the fish captured in the pursing nets so they may be scooped up. There are brackets mounted on the ring supporting the brailing net and lines are attached thereto that are retractably supported from a boom on the ship. The rear end of the line is attached to a winch which raises the brailer net portion of the brailing pole upwardly out of the water with fish captured therein. The boom is then pivoted to transport the brailer net over the deck of the ship and it is then lowered to a fish deposit station. Once the brailer net has been emptied of its catch, the brailing pole is returned to the crew members aboard the skiff.

Often times the sea is rough and causes the skiff to bob like a ball on the water. This makes it difficult for the crewmen aboard the skiff to push the brailer net at the forward end of the brailing pole down into the fish captured within the pursing net. Occasionally one or more of the crewmen lose their balance, falling into the water, while performing their job and their rescue causes a time consuming delay in loading the catch into the ship.

It is an object of the invention to provide a novel brailing system for commercial fishing boats that allows the catch to be transferred from the pursing net to the ship much quicker.

It is also an object of the invention to provide a novel brailing system for commercial fishing boats that is safer for the crewmen who work in the skiffs.

It is another object of the invention to provide a novel brailing system for commercial fishing boats that eliminates one or more crewmen from the previous process of dipping the brailing pole into the pursing net in order to scoop up the fish therein.

It is a further object of the invention to provide a novel brailing system for commercial fishing boats that is economical to manufacture and install.

SUMMARY OF THE INVENTION

The manner in which the applicant has improved the brailing system for commercial fishing boats will now be described. An upright support standard has its bottom end secured to the deck of the ship. The longitudinal axis of the support standard makes an acute angle with the deck of the ship and it also extends laterally so that its top end is positioned out over the water. A vertically oriented tubular post is mounted on the top end of the support standard. A tubular sleeve has a bracket mounted on its bottom lateral surface so it is pivotable about a horizontal axis and this bracket is also mounted on a swivel assembly that is connected to the top end of the tubular post thereby allowing the tubular sleeve to be swiveled about a vertical axis. There is structure in the swivel assembly that restricts the degrees of horizontal rotation of the tubular sleeve to 110 degrees.

A brailing pole is reciprocally received within the tubular sleeve. The forward end of the brailing pole has a ring having diametrically opposed brackets secured thereto on its upper surface. The ring supports the brailing net to form a closed loop configuration at its top end and the bottom end of the brailing net can be drawn together in the manner of closing a purse by a line that is secured to rings on the bottom end of the brailing net. The rear end of the brailing pole has a shackle thereon and a line is attached thereto and it is threaded through a ring mounted on the post attachmment support assembly. This line then extends to a crewmember standing on an upper deck area who at times secures his end of the line to a cleat mounted on the side railing.

With applicant's novel structure for mounting the brailing pole, it is no longer necessary to have three or more crew members standing on the skiff attempting to push the forward end of the brailing pole down into the interior of the pursing net. A member of the crew working the winch control console now swings the brailing pole out over the side of the ship and lowers its forward end down into the interior of the pursing net. The tubular sleeve through which the brailing pole reciprocally allows this to happen since the tubular sleeve is pivotally supported about a horizontal axis and also has a swivel assembly that allows the brailing pole to be pivoted out over the side of the ship. The gravitational weight of the ring and net mounted on the forward end of the brailing pole is sufficient to drive it downwardly beneath the fish captured in the pursing net. The crewmember working the line attached to the rear of the brailing pole has to be atuned to pulling in and letting out the line at different times during the operation. The line attached to the bottom end of the brailing net for drawing it closed and loosening it is operated by another crewmember. This line is drawn inwardly prior to the brailing net being dipped down into the pursing net. It is maintained in its closed state until the brailing net has been picked upwardly and transported over top of the fish deposit station, at which time it is released to allow the fish to drop out of the bottom of the net.

DESCRIPTION OF THE PREFERRED EMBODIMENT

Figure 1:
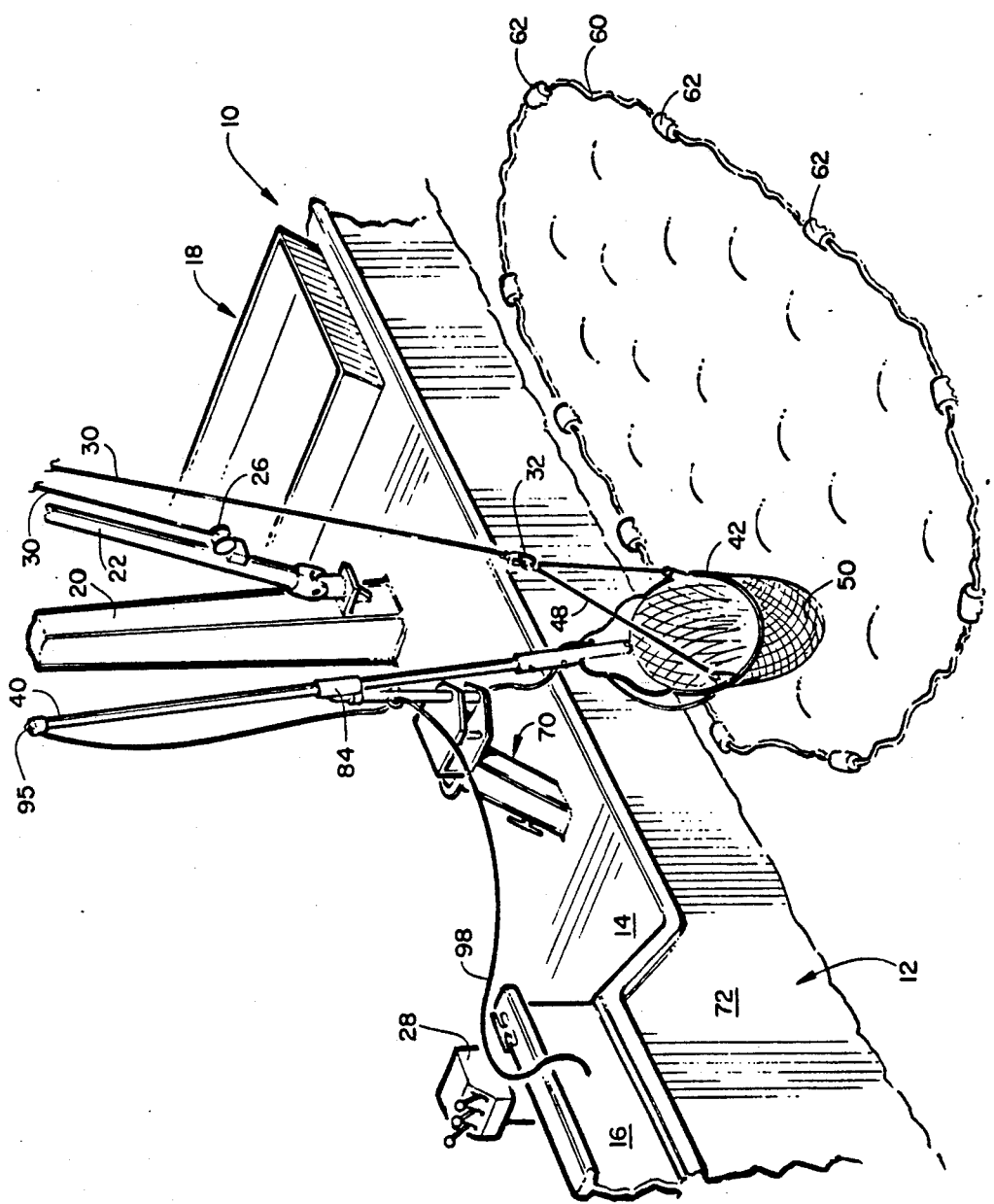
FIG. 1 is a perspective view illustrating the brailing net being dipped into the pursing net.

Applicant's novel brailing system for commercial boats will now be described by referring to FIGS. 1-4 of the drawings.

A fishing ship 10 has a hull 12, a top deck 14, side railing 16 and fish unloading station 18. A mast 20 extends upwardly from top deck 14. A boom 22 has its bottom end pivotally connected to a swivel assembly 24. A winch 26 is mounted on boom 22 and it is operated by winch control console 28. Conventional pulleys (not shown) are mounted adjacent the top end of boom 22 and line 30 passes around them and a shackle 32 is attached to its free end.

Brailing pole 40 has a ring 42 rigidly secured to its front end. Reinforcement plates 44 give structural integrity to the unit. A pair of diametrically opposed brackets 48 are secured to the top surface of ring 42 and lines 48 have their bottom ends attached thereto and their top end is attached to shackle 32. A brailer net 50 is formed into a closed loop at its top end and it is attached to ring 44 in a conventional manner. The bottom end of brailer net 50 has a series of rings 52 secured thereto and a line 54 is threaded through these rings so that the bottom end of the brailer net can be drawn closed when so desired. Line 54 passes upwardly through an aperture 56 in one of the reinforcing plates and its free end would be handled by a crewmember.

Figure 2:
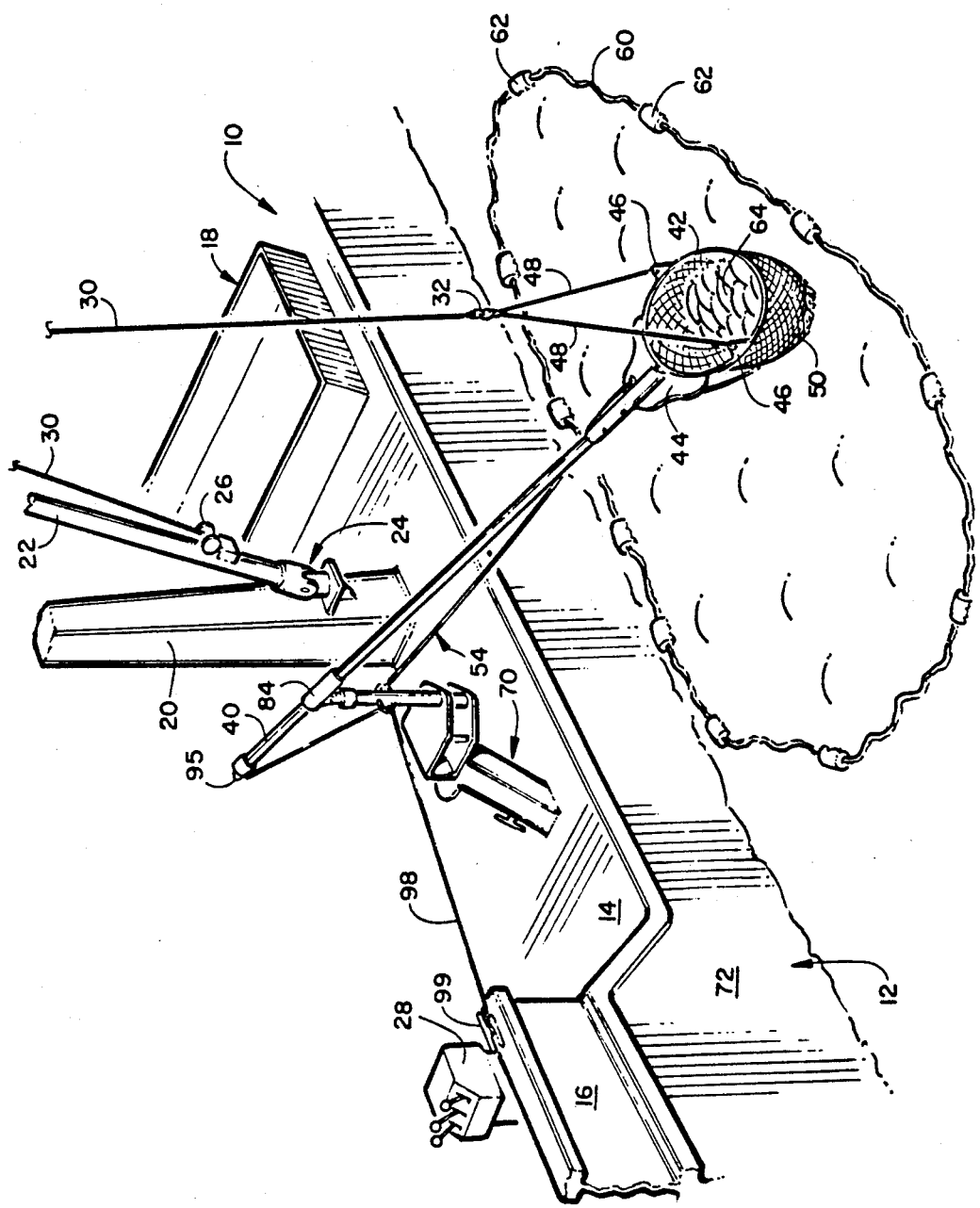
FIG. 2 is a perspective view illustrating the brailing net being lifted out of the pursing net with a full load of fish.
Figure 3:
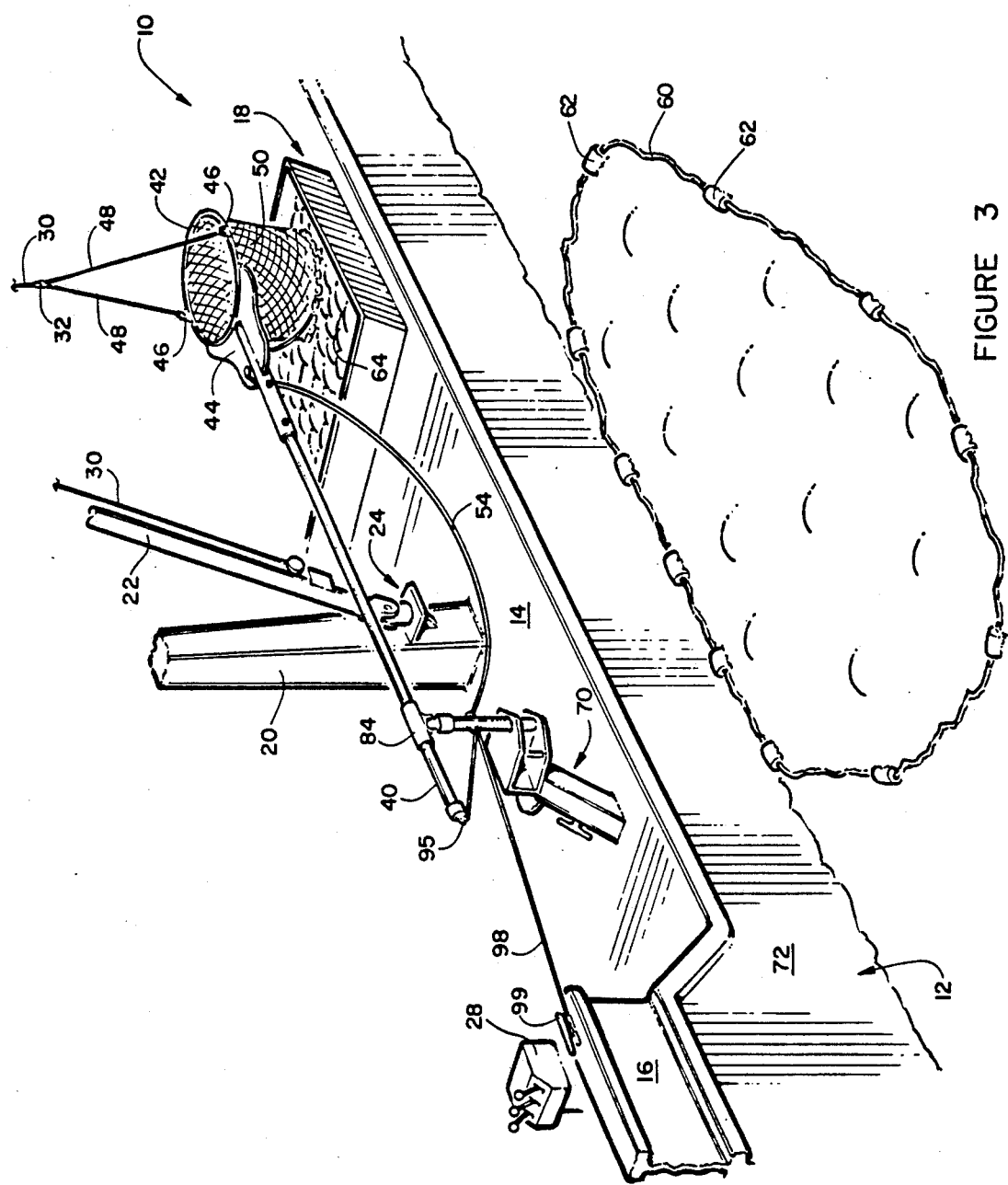
FIG. 3 is a perspective view illustrating the brailing net after it has been transported upwardly and over the fish deposit station for unloading of the catch.
Figure 4:
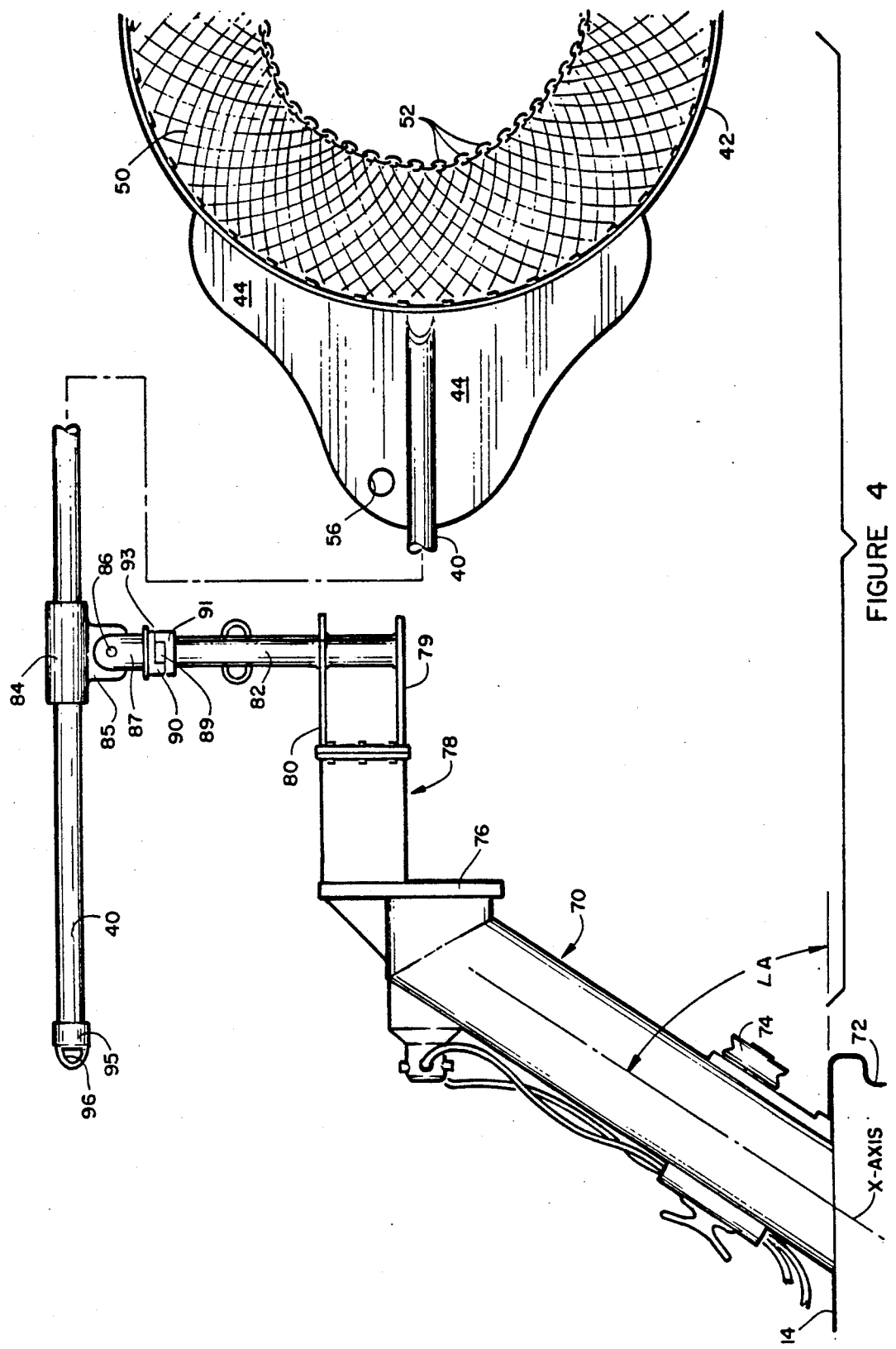
FIG. 4 is a side elevation view of the novel structure for supporting the brailer pole.

In FIGS. 1-3 a pursing net 60 has been drawn into close proximity to the hull 12 of ship 10. It has a plurality of floats 62 attached to its top surface. A catch of fish 64 is captured within the confines of pursing net 60. A support standard 70 has its bottom end secured to deck 14. It has a longitudinally extending x-axis that makes an acute angle A with the top surface of deck 14. Its top end extends laterally out over the side 72 of hull 12. A pulley 74 is mounted adjacent its bottom end. A plate 76 is attached to the top end of support standard 70. To this is secured the post attachment support assembly 78.

Post attachment support assembly 78 has a base plate 79, a reinforcement plate 80 and a vertically oriented post 82 has its bottom end thereto. A tubular sleeve 84 has a bracket 85 mounted on its lateral bottom surface. A pin 86 passes through bifurcated yoke 87 to allow tubular sleeve 84 to pivot about a horizontal axis. Bifurcated yoke 87 has a downwardly extending cylindrical rod 89 that is journaled in post 82. Collars 90 and 91 are part of a swivel assembly 93 that limits the rotation of tubular sleeve 84 about a vertical axis to a maximum of 110 degrees. Tubular sleeve 84 has an internal diameter that is slightly larger than the outside diameter D1 of brailer pole 40. A shackle 95 having an eyelet 96 is mounted on the rear end of brailer pole 40. A line 98 has its one end attached to eyelet 96 and its other end would be held by a crewman who sometimes ties it off on cleat 99.

What is claimed is:

1. A brailing system for commercial fishing boats comprsing:
    a fishing ship having a hull with upright oriented lateral side walls and a top deck, a mast extending upwardly from said top deck;
    an elongated boom having a top end and a bottom end, the bottom end of said boom being pivotally connected to a swivel assembly mounted on structure on said top deck;
    a fish unloading station on said top deck;
    an upright support standard having a top end and a bottom end and a longitudinally extending axis, the bottom end of said support standard being secured to said top deck;
    a post attachment support assembly connected to the top end of said support standard;
    a vertically oriented tubular post having a top end and a bottom end, said bottom end being secured to said post attachment support assembly;
    an elongated brailer pole having a front end and a rear end, said brailer pole having a predetermined diameter D1, a net support ring mounted on the front end of said pole;
    a brailer net having a top end and a bottom end, said top end formed into a closed loop having a diameter substantially equal to that of said net support ring, the bottom end of said net having means for completely closing it to trap fish in its interior and also for opening it so that fish captured there within can be unloaded;
    a tubular sleeve having an internal diameter slightly larger than D1 and said brailer pole is reciprocally positioned therein;
    means for pivoting said tubular sleeve about a horizontal axis so that said brailer net can be dipped into a pursing net full of fish; and
    means connected to the top end of said tubular post for permitting said tubular sleeve to be pivoted about a verticle axis.

2. A brailing system for commercial fishing boats as recited in claim 1 wherein the longitudinal axis of said support standard makes an acute angle A with the top deck of said ship.

3. A brailing system for commercial fishing boats as recited in claim 2 wherein said longitudinal axis of said support standard is directed laterally out over the side wall of said hull in a cantilevered configuration.

4. A brailing system for commercial fishing boats as recited in claim 1 further comprising a predetermined length of line having a front end and a rear end, the front end of said line being secured to the rear end of said brailer pole.

5. A brailing system for commercial fishing boats as recited in claim 1 further comprising means for limiting the horizontal rotation of said tubular sleeve to no more than 110 degrees.

6. A brailing system for commercial fishing boats as recited in claim 1 wherein said means for completely closing the bottom end of said brailer net comprises a plurality of rings attached to the bottom end of the net, a cable running through said rings, and said brailer pole having at least one reinforcement plate and it has an aperture therein through which said cable is threaded.

7. A brailing system for commercial fishing boats as recited in claim 4 further comprising a ring mounted on said post attachment support assembly and said line from the rear end of said brailing pole is threaded therethrough.

8. A brailing system for commercial fishing boats as recited in claim 1 further comprising a winch mounted on said boom, a second line having a front end and a rear end, said rear end being connected to said winch and said front end being connected to the net support ring of said brailer pole.

* * * * *